(12) United States Patent
Fukui et al.

(10) Patent No.: US 12,372,699 B2
(45) Date of Patent: Jul. 29, 2025

(54) OPTICAL COMPONENT AND OPTICAL APPARATUS

(71) Applicant: CANON KABUSHIKI KAISHA, Tokyo (JP)

(72) Inventors: Shinji Fukui, Tochigi (JP); Seiji Kuwabara, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 683 days.

(21) Appl. No.: 17/507,677

(22) Filed: Oct. 21, 2021

(65) Prior Publication Data

US 2022/0128749 A1   Apr. 28, 2022

(30) Foreign Application Priority Data

Oct. 28, 2020  (JP) ................................ 2020-180167

(51) Int. Cl.
*G02B 5/08* (2006.01)
*G02B 5/20* (2006.01)
*G02B 5/26* (2006.01)
*G02B 5/28* (2006.01)

(52) U.S. Cl.
CPC ............ *G02B 5/285* (2013.01); *G02B 5/0825* (2013.01); *G02B 5/208* (2013.01); *G02B 5/26* (2013.01)

(58) Field of Classification Search
CPC ...... G02B 5/285; G02B 5/0825; G02B 5/208; G02B 5/26; G02B 5/0891; G02B 1/10; G02B 1/116; G02B 5/20; G02B 1/02; G02B 1/115; G02B 5/28; B32B 7/023; B32B 9/00

See application file for complete search history.

(56) References Cited

U.S. PATENT DOCUMENTS

| | | | |
|---|---|---|---|
| 4,643,951 A * | 2/1987 | Keem | ..................... C23C 28/00 428/421 |
| 5,850,309 A | 12/1998 | Shirai | |
| 6,501,589 B1 * | 12/2002 | Goossen | ................. H01S 5/183 359/290 |

(Continued)

FOREIGN PATENT DOCUMENTS

| | | |
|---|---|---|
| CN | 103424788 A | 12/2013 |
| CN | 105814464 A | 7/2016 |

(Continued)

OTHER PUBLICATIONS

Wang Zhijiang, et al., Optical thin film and its applications, Shanhai Jialong University, Feb. 2014,.

*Primary Examiner* — Wyatt A Stoffa
*Assistant Examiner* — John Curtis Sipes
(74) *Attorney, Agent, or Firm* — CANON U.S.A., INC. IP DIVISION

(57) ABSTRACT

An optical component includes a base and a multilayer film including a first layer group located on the base and a second layer group located between the first layer group and the base. The second layer group includes a first dielectric layer and a second dielectric layer alternately stacked, the first layer group includes a third dielectric layer and a fourth dielectric layer alternately stacked. The first dielectric layer has a higher refractive index than the second dielectric layer, and the third dielectric layer has a higher refractive index than the fourth dielectric layer.

19 Claims, 4 Drawing Sheets

(56) References Cited

U.S. PATENT DOCUMENTS

| | | | |
|---|---|---|---|
| 6,797,388 B1* | 9/2004 | Szanyi | C03C 17/3681 |
| | | | 428/428 |
| 2004/0258947 A1* | 12/2004 | Moelle | C23C 14/34 |
| | | | 428/632 |
| 2008/0100909 A1* | 5/2008 | Tsuda | G03F 7/70958 |
| | | | 359/355 |
| 2009/0153971 A1 | 1/2009 | Takada | |
| 2009/0086771 A1 | 4/2009 | Usui | |
| 2010/0171406 A1 | 7/2010 | Morino | |
| 2012/0154916 A1 | 6/2012 | Nishimoto | |
| 2014/0247481 A1* | 9/2014 | Fasold | G02B 5/0891 |
| | | | 359/359 |
| 2015/0219805 A1 | 8/2015 | Schreiber | |
| 2016/0202396 A1 | 7/2016 | Goehnermeier | |
| 2018/0203354 A1 | 7/2018 | Fujii | |
| 2019/0310394 A1* | 10/2019 | Miyamoto | G02B 1/18 |
| 2020/0096833 A1* | 3/2020 | Lee | G02B 5/1809 |
| 2021/0026252 A1* | 1/2021 | Treubel | G02B 7/1827 |
| 2022/0131333 A1* | 4/2022 | Ramberg | H01S 3/083 |

FOREIGN PATENT DOCUMENTS

| | | |
|---|---|---|
| JP | H01128829 A | 5/1989 |
| JP | H07244205 A | 9/1995 |
| JP | H11211916 A | 8/1999 |
| JP | 2000028809 A | 1/2000 |
| JP | 2001174611 A | 6/2001 |
| JP | 2002014203 A | 1/2002 |
| JP | 2004294841 A | 10/2004 |
| JP | 2005257769 A | 9/2005 |
| JP | 2005345492 A | 12/2005 |
| JP | 2007141976 A | 6/2007 |
| JP | 2015212736 A | 11/2015 |
| JP | 2016080782 A | 5/2016 |
| JP | 2017083789 A | 5/2017 |
| JP | 2018529127 A | 10/2018 |
| JP | 2019174695 A | 10/2019 |
| JP | 2020179645 A | 11/2020 |
| KR | 20120091481 A | 8/2012 |
| KR | 20160043916 A | 4/2016 |
| KR | 20180058782 A | 6/2018 |
| KR | 20190019069 A | 2/2019 |
| KR | 20190108073 A | 9/2019 |
| KR | 20200034500 A | 3/2020 |

* cited by examiner

FIG. 2

OPTICAL COMPONENT AND OPTICAL APPARATUS

BACKGROUND OF THE INVENTION

Field of the Invention

The present disclosure relates to an optical component.

Description of the Related Art

Due to their high design flexibility, multilayer films formed of a plurality of dielectric layers are widely used for antireflection films, reflective films, and filter films in optical components.

Japanese Patent Laid-Open No. 2005-345492 and Japanese Patent Laid-Open No. 7-244205 disclose an optical device including a dielectric multilayer film.

In the techniques described in Japanese Patent Laid-Open No. 2005-345492 and Japanese Patent Laid-Open No. 7-244205, studies to improve optical characteristics of optical devices are insufficient.

SUMMARY OF THE INVENTION

An optical component according to a first aspect of the present disclosure includes a base and a multilayer film including a first layer group located on the base and a second layer group located between the first layer group and the base, wherein the second layer group includes a first dielectric layer and a second dielectric layer alternately stacked, the first layer group includes a third dielectric layer and a fourth dielectric layer alternately stacked, the first dielectric layer has a higher refractive index than the second dielectric layer, the third dielectric layer has a higher refractive index than the fourth dielectric layer, and at least one of (i) to (iii) is satisfied: (i) the third dielectric layer has a higher refractive index than the first dielectric layer, (ii) a difference between the refractive index of the third dielectric layer and the refractive index of the fourth dielectric layer is larger than a difference between the refractive index of the first dielectric layer and the refractive index of the second dielectric layer, and (iii) the third dielectric layer has a lower density than the first dielectric layer.

An optical component according to a second aspect of the present disclosure includes a base and a multilayer film located on the base, wherein the multilayer film includes a first dielectric layer, a second dielectric layer, a third dielectric layer, and a fourth dielectric layer, the first dielectric layer is located between the second dielectric layer and the base, and a distance between the first dielectric layer and the second dielectric layer is smaller than a thickness of the first dielectric layer, the third dielectric layer is located between the fourth dielectric layer and the base, and a distance between the third dielectric layer and the fourth dielectric layer is smaller than a thickness of the third dielectric layer, the first dielectric layer contains ytterbium fluoride, the third dielectric layer contains at least one of neodymium fluoride, lanthanum fluoride, gadolinium fluoride, samarium fluoride, cerium fluoride, and aluminum oxide, and each of the second dielectric layer and the fourth dielectric layer contains at least one of magnesium fluoride, aluminum fluoride, sodium fluoride, lithium fluoride, calcium fluoride, barium fluoride, strontium fluoride, silicon oxide, cryolite, and chiolite.

An optical component according to a third aspect of the present disclosure includes a base and an ytterbium fluoride layer located on the base, wherein the ytterbium fluoride layer has a refractive index of 1.65 or more for light with a wavelength of 193 nm.

Further features of the present disclosure will become apparent from the following description of exemplary embodiments with reference to the attached drawings.

BRIEF DESCRIPTION OF THE DRAWINGS

FIG. 2 is a periodic table.

DESCRIPTION OF THE EMBODIMENTS

Figure 1:
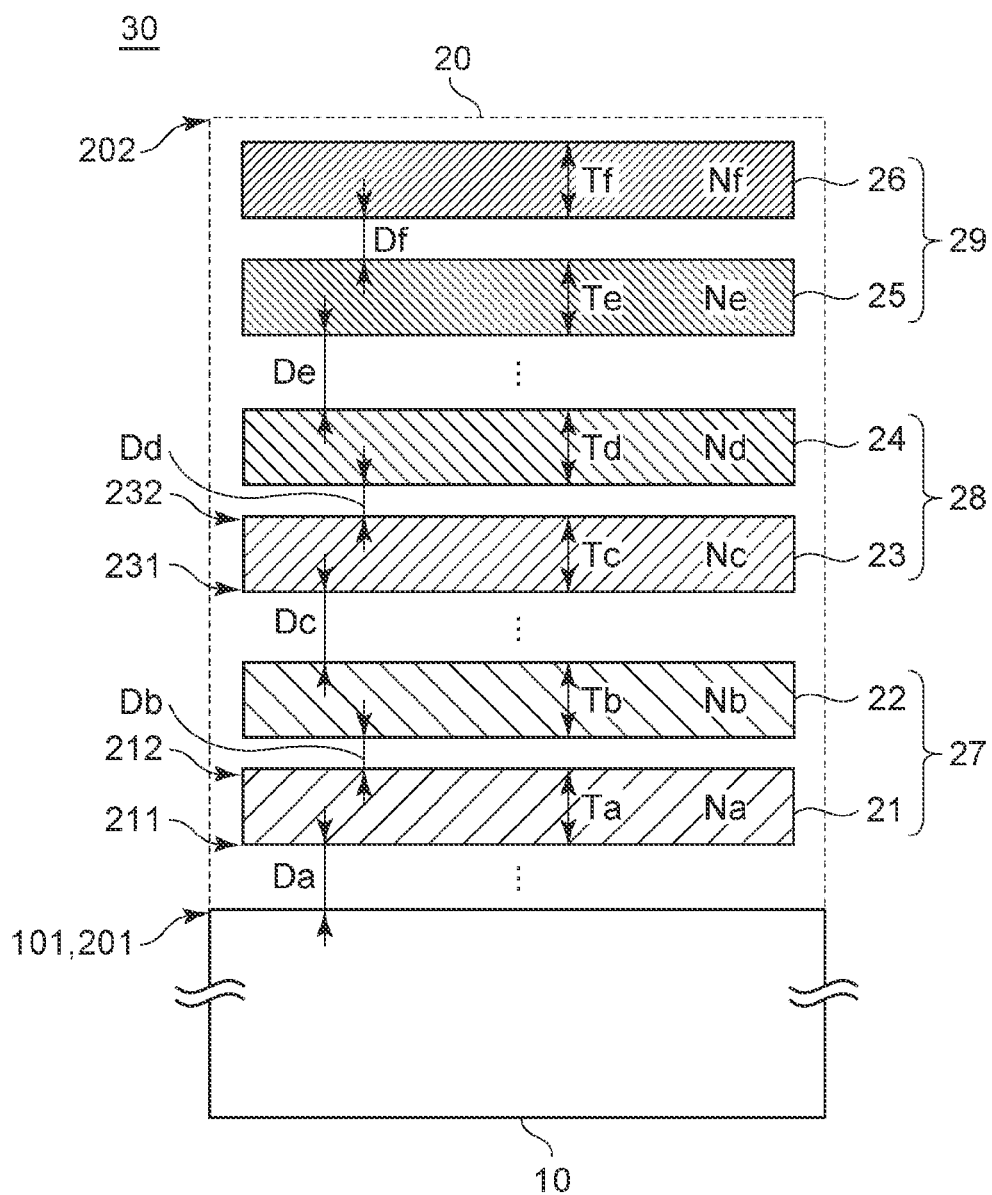
FIG. 1 is a schematic view of an optical component.

Embodiments of the present disclosure are described below with reference to the accompanying drawings. Like reference numerals denote like parts in the following description and drawings. A common part is sometimes described with reference to a plurality of drawings without notice. A part with a common reference numeral may not be described again.

The present disclosure provides an advantageous technique for improving optical characteristics of optical components.

An optical component 30 is described with reference to FIG. 1. The optical component 30 includes a base 10 and a multilayer film 20 located on the base 10. The optical component 30 can be used such that light enters the multilayer film 20 from the opposite side of the multilayer film 20 from the base 10. Alternatively, the optical component 30 can be used such that light enters the multilayer film 20 from the base 10. The multilayer film 20 in the optical component 30 can be used as a reflective film to reflect light of a predetermined wavelength. Alternatively, the multilayer film 20 in the optical component 30 can be used as a filter film to selectively transmit light of a predetermined wavelength. Alternatively, the multilayer film 20 can be used as an antireflection film to prevent reflection from the optical component 30.

The multilayer film 20 includes a dielectric layer group 27 and a dielectric layer group 28. The dielectric layer group 27 is located between the dielectric layer group 28 and the base 10. Furthermore, the multilayer film 20 may include a dielectric layer group 29 (FIG. 3B). The dielectric layer group 28 is located between the dielectric layer group 27 and the dielectric layer group 29.

The multilayer film 20 includes a dielectric layer 21, a dielectric layer 22, a dielectric layer 23, and a dielectric layer 24. Furthermore, the multilayer film 20 may include a dielectric layer 25 and a dielectric layer 26 and does not necessarily include at least one of the dielectric layer 25 and the dielectric layer 26. The multilayer film 20 is formed of a large number of dielectric layers and can therefore be referred to as a dielectric laminated film or a dielectric multilayer film.

The dielectric layer group 27 includes the dielectric layer 21 and the dielectric layer 22. The dielectric layer 21 is located between the dielectric layer 22 and the base 10. In the dielectric layer group 27, the dielectric layer 21 and the dielectric layer 22 are preferably alternately stacked. The dielectric layer group 28 includes the dielectric layer 23 and the dielectric layer 24. The dielectric layer 23 is located between the dielectric layer 24 and the base 10. In the dielectric layer group 28, the dielectric layer 23 and the dielectric layer 24 are preferably alternately stacked. The phrase "a first layer and a second layer are alternately stacked", as used herein, means that at least one second layer is located between two first layers, and at least one first layer is located between two second layers. Thus, alternately stacked first layers and second layers include at least four layers. For brevity, the dielectric layer group 27 in FIG. 1 includes only two layers of different types: the dielectric layers 21 and 22. Although the multilayer film 20 includes the dielectric layer group 27 and the dielectric layer group 28 in the present embodiment, a combination of the dielectric layer 21, the dielectric layer 22, the dielectric layer 23, and the dielectric layer 24 may be repeatedly stacked. The dielectric layer group 29 includes the dielectric layer 25 and the dielectric layer 26. In the dielectric layer group 29, the dielectric layer 25 and the dielectric layer 26 may or may not be alternately stacked.

The dielectric layer 21 is located between the base 10 and the dielectric layer 23. The refractive index Na of the dielectric layer 21 is higher than the refractive index Nb of the dielectric layer 22 (Na>Nb). The distance Db between the dielectric layer 21 and the dielectric layer 22 is smaller than the thickness Ta of the dielectric layer 21 (Db<Ta). This means that the dielectric layer 21 and the dielectric layer 22 are located close to each other (adjacent to each other). Although the dielectric layer 22 is typically in contact with the dielectric layer 21, and the distance Db is 0, another dielectric layer (not shown) may be located between the dielectric layer 21 and the dielectric layer 22. The refractive index Nc of the dielectric layer 23 is higher than the refractive index Nd of the dielectric layer 24 (Nc>Nd). The distance Dc between the dielectric layer 22 and the dielectric layer 23 depends on the number of layers of interest between the dielectric layer 22 and the dielectric layer 23 and may be less than 1 μm. The distance Dc may be larger than the thickness Tb and the thickness Tc. The distance Dd between the dielectric layer 23 and the dielectric layer 24 is smaller than the thickness Tc of the dielectric layer 23 (Dd<Tc). Typically, the dielectric layer 24 is in contact with the dielectric layer 23, and the distance Dd is 0. Another dielectric layer (not shown) may be located between the dielectric layer 23 and the dielectric layer 24. The distance Df between the dielectric layer 25 and the dielectric layer 26 is smaller than the thickness Te of the dielectric layer 25 (Df<Te). Typically, the dielectric layer 26 is in contact with the dielectric layer 25, and the distance Df is 0. Another dielectric layer (not shown) may be located between the dielectric layer 25 and the dielectric layer 26. The distance De between the dielectric layer 24 and the dielectric layer 25 depends on the number of layers of interest between the dielectric layer 24 and the dielectric layer 25 and may be less than 1 μm. The distance De may be larger than the thickness Td and the thickness Tf.

Figure 2:
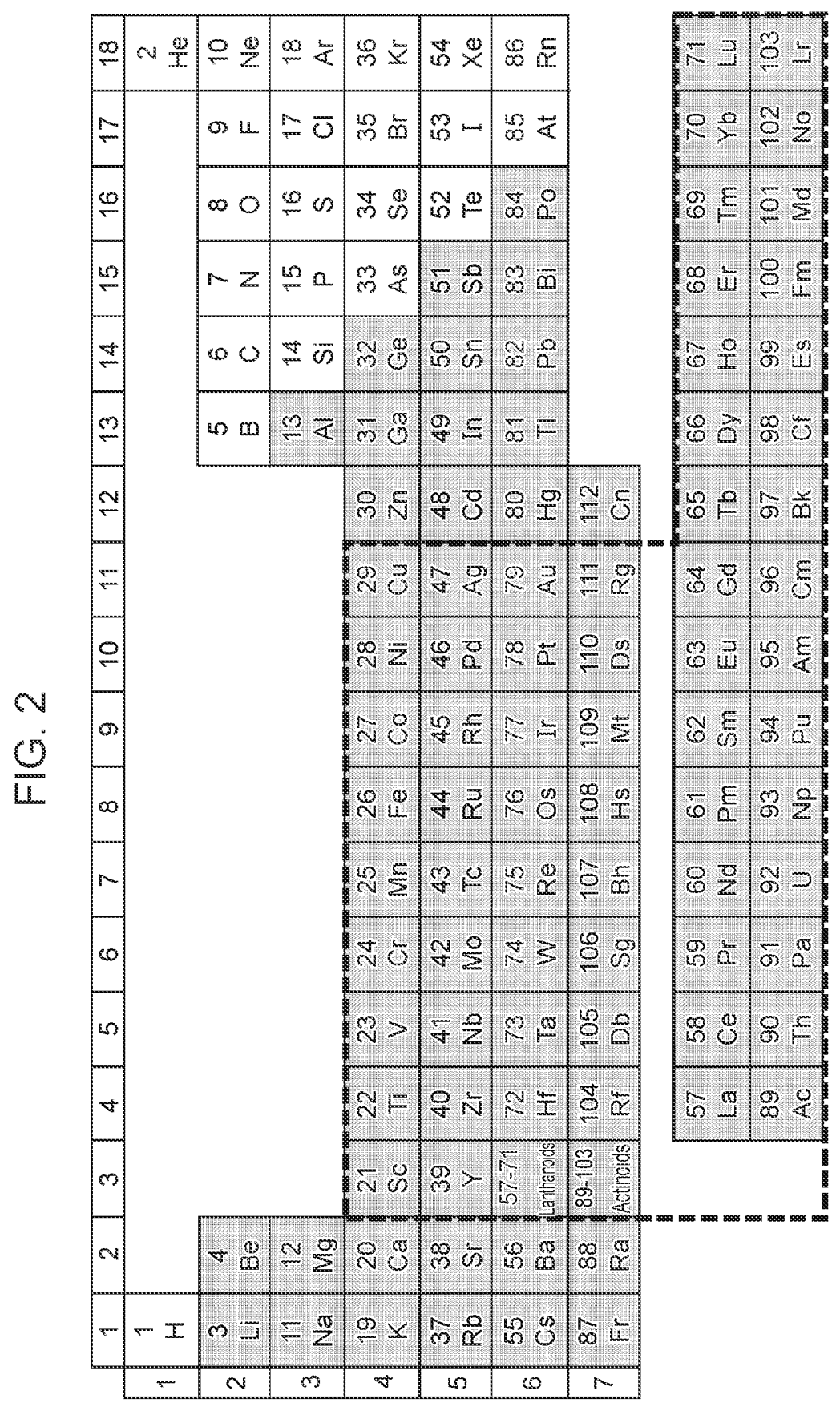

The dielectric layer 21 contains a compound of a metal element Mtla. The dielectric layer 23 contains a compound of a metal element Mtlc. The metal element Mtlc is different from the metal element Mtla. Two different elements have different atomic numbers, and two same elements have the same atomic number. FIG. 2 shows a periodic table with element symbols and atomic numbers. Hatched elements are metal elements, and unhatched elements are non-metal elements.

The dielectric layer 21 and the dielectric layer 23 have different compositions. The term "composition", as used herein, refers to at least one of a combination of all elements constituting the dielectric layers 21 and 23 and the ratio of all the elements.

The dielectric layers 21 and 23 have a higher refractive index than their respective adjacent dielectric layers 22 and 24. Of the two adjacent dielectric layers, the dielectric layers with a higher refractive index (the dielectric layers 21 and 23) are referred to as high-refractive-index layers, and the dielectric layers with a lower refractive index (the dielectric layers 22 and 24) are referred to as low-refractive-index layers. The physical thickness required for the dielectric layers 21 and 23 with an optical thickness in a predetermined range can be smaller than the physical thickness required for the dielectric layers 22 and 24 with an optical thickness in a predetermined range. This increases the degree of freedom in material selection and film thickness. Thus, the dielectric layers 21 and 23 are suitable for making their compositions different. The optical thickness of each of the dielectric layers 21, 22, 23, and 24 can be appropriately set in accordance with the wavelength λa of transmitted or reflected light and is typically less than the wavelength λa, for example, λa/8 to 3λa/8. The optical thicknesses of the dielectric layers 21, 22, 23, and 24 may be different or the same.

In a dielectric laminated film, the reflectance at an interface between a low-refractive-index layer and a high-refractive-index layer is preferably high to utilize interference of reflected light at the interface between the low-refractive-index layer and the high-refractive-index layer and realize desired optical characteristics. In a low-refractive-index layer and a high-refractive-index layer located close to each other (for example, forming an interface), the low-refractive-index layer has a refractive index Nt, and the high-refractive-index layer has a refractive index Nk. The reflectance R between a low-refractive-index layer and a high-refractive-index layer (for example, at the interface) is simply expressed by $R=\{(Nk-Nt)/(Nk+Nt)\}^2$. Thus, the reflectance R increases with a decrease in the sum of the refractive index Nt of the low-refractive-index layer and the refractive index Nk of the high-refractive-index layer and with an increase in the difference between the refractive index Nt of the low-refractive-index layer and the refractive index Nk of the high-refractive-index layer.

The concentration Ccc of the metal element Mtlc in the dielectric layer 23 may be different from the concentration Cca of the metal element Mtlc in the dielectric layer 21 (Ccc≠Cca). The concentration Ccc of the metal element Mtlc in the dielectric layer 23 is preferably higher than the concentration Cca of the metal element Mtlc in the dielectric layer 21 (Ccc>Cca). In a typical example, the dielectric layer 21 may not contain the metal element Mtlc, and the concentration Cca of the metal element Mtlc in the dielectric layer 21 may be zero. In a modification example, the dielectric layer 21 may contain a compound of the metal element Mtla and a compound of the metal element Mtlc, and the dielectric layer 23 may also contain a compound of the metal element Mtla and a compound of the metal element Mtlc.

The concentration Caa of the metal element Mtla in the dielectric layer 21 may be different from the concentration Cac of the metal element Mtla in the dielectric layer 23 (Caa≠Cac). The concentration Caa of the metal element Mtla in the dielectric layer 21 is preferably higher than the concentration Cac of the metal element Mtla in the dielectric layer 23 (Caa>Cac). In a typical example, the dielectric layer 23 may not contain the metal element Mtla, and the concentration Caa of the metal element Mtla in the dielectric layer 21 may be zero. In another example, the dielectric layer 21 may contain a compound of the metal element Mtla and a compound of the metal element Mtlc, and the dielectric layer 23 may also contain a compound of the metal element Mtla and a compound of the metal element Mtlc.

The metal element Mtla may be a transition element. The metal element Mtlc may be a transition element. In the periodic table shown in FIG. 2, elements in a thick frame are transition elements, and elements outside the thick frame are typical elements. Comparing compounds of the same non-metal element, a compound of a transition metal element typically has a higher refractive index than a compound of a typical metal element and is therefore suitable as a material for a high-refractive-index layer. However, at least one of the metal element Mtla and the metal element Mtlc may be a typical element.

A compound in the dielectric layer 21 is, for example, a compound of the metal element Mtla and a non-metal element Ntla, for example, a boride, a carbide, a nitride, an oxide, a fluoride, a sulfide, a phosphide, or a chloride, typically an oxide or a fluoride. A compound in the dielectric layer 23 is, for example, a compound of the metal element Mtlc and the non-metal element Ntla, for example, a boride, a carbide, a nitride, an oxide, a fluoride, a sulfide, a phosphide, or a chloride, typically an oxide or a fluoride. The non-metal element Ntlc may be the same as the non-metal element Ntla, or the non-metal element Ntlc may be different from the non-metal element Ntla.

The metal element Mtla may be a rare-earth element. The metal element Mtlc may be a rare-earth element. Rare-earth elements are elements with atomic numbers of 21, 39, and 57 to 71. The dielectric layer 21 may contain a fluoride. A compound in the dielectric layer 21 may be a fluoride of the metal element Mtla. The dielectric layer 23 may contain a fluoride. A compound in the dielectric layer 23 may be a fluoride of the metal element Mtlc.

Many metal fluorides absorb less ultraviolet radiation than many metal oxides. In the optical component 30 that utilizes ultraviolet light by transmission or reflection, therefore, a metal fluoride contained in at least one of the dielectric layers 21 and 23 is effective in increasing the use efficiency of ultraviolet light.

The dielectric layer 23 can contain at least one of neodymium fluoride ($NdF_3$), lanthanum fluoride ($LaF_3$), gadolinium fluoride ($GdF_3$), samarium fluoride ($SmF_3$), cerium fluoride ($CeF_3$), and aluminum oxide ($Al_2O_3$). The dielectric layer 21 can contain ytterbium fluoride ($YbF_3$).

In another example, the metal element Mtla can be a group 4 element or a group 5 element.

The metal element Mtlc can be a group 4 element or a group 5 element. When the metal element Mtla or the metal element Mtlc is titanium, zirconium, or hafnium, and when the non-metal element Ntla or Ntlc is oxygen, the dielectric layers 21 and 22 contain titanium oxide, zirconium oxide, or hafnium oxide.

In another example, the metal element Mtla can be a group 12 element or a group 13 element. The metal element Mtlc can be a group 12 element or a group 13 element.

When the metal element Mtla or the metal element Mtlc is zinc, aluminum, gallium, or indium, and when the non-metal element Ntla or Ntlc is oxygen, the dielectric layers 21 and 22 contain zinc oxide, aluminum oxide, or gallium oxide.

The different compositions of the dielectric layer 21 and the dielectric layer 23 can improve the function of the multilayer film 20. The different compositions of the dielectric layer 21 and the dielectric layer 23 result in different optical characteristics, chemical characteristics, and mechanical characteristics of the dielectric layers. As optical characteristics, the refractive index or the extinction coefficient may be different. As chemical characteristics, the diffusion constant or adhesiveness may be different. As mechanical characteristics, the surface profile, thermal expansion coefficient, or elastic modulus may be different. A combination of these characteristics can improve the function of the multilayer film 20.

In a dielectric laminated film, the reflectance (for example, at the interface) between a high-refractive-index layer and a low-refractive-index layer is preferably high to utilize interference of reflected light at the interface between the high-refractive-index layer and the low-refractive-index layer and realize desired optical characteristics. For this purpose, the refractive index ratio (Nk/Nt) or the refractive index difference (Nk−Nt) of the high-refractive-index layer and the low-refractive-index layer is preferably larger, and the sum of the refractive indices (Nk+Nt) of the high-refractive-index layer and the low-refractive-index layer is preferably smaller.

The reflectance Ra at the interface between the dielectric layer 21 and the dielectric layer 22 is expressed by $Ra=\{(Na-Nb)/(Na+Nb)\}^2$. The reflectance Rc at the interface between the dielectric layer 23 and the dielectric layer 24 is expressed by $Rc=\{(Nc-Nd)/(Nc+Nd)\}^2$. The condition for Ra<Rc is Na/Nb<Nc/Nd, and the condition for Ra>Rc is Na/Nb>Nc/Nd.

For example, Rc>Ra is preferably satisfied when light enters the multilayer film 20 from the opposite side of the multilayer film 20 from the base 10 and when light of a predetermined wavelength is reflected by the multilayer film 20. This is because it is advantageous to place a reflective surface (interface) with a higher refractive index closer to the light incident surface (an upper surface 202) in order to increase the reflectance of the multilayer film 20. Rc>Ra is also preferably satisfied when light enters the multilayer film 20 from the base 10 and when light of a predetermined wavelength is transmitted by the multilayer film 20. This is because it is advantageous to place a reflective surface (interface) with a higher refractive index farther from the light incident surface (the upper surface 202) in order to increase the transmittance of the multilayer film 20.

The ratio Nc/Nd of the refractive index Nc of the dielectric layer 23 to the refractive index Nd of the dielectric layer 24 may be larger than the ratio Na/Nb of the refractive index Na of the dielectric layer 21 to the refractive index Nb of the dielectric layer 22 (Nc/Nd>Na/Nb). Satisfying Nc/Nd>Na/Nb is advantageous for satisfying Rc>Ra.

The difference Nc−Nd between the refractive index Nc of the dielectric layer 23 and the refractive index Nd of the dielectric layer 24 may be larger than the difference Na−Nb between the refractive index Na of the dielectric layer 21 and the refractive index Nb of the dielectric layer 22 (Nc−Nd>Na−Nb). The reflectance Rc increases with the difference Nc−Nd.

The sum Nc+Nd of the refractive index Nc of the dielectric layer 23 and the refractive index Nd of the dielectric layer 24 may be smaller than the sum Na+Nb of the refractive index Na of the dielectric layer 21 and the refractive index Nb of the dielectric layer 22 (Nc+Nd<Na+Nb). The reflectance Rc increases as the sum Nc+Nd decreases.

The refractive index Nc of the dielectric layer 23 may be higher than the refractive index Na of the dielectric layer 21

(Nc>Na). If Nc>Na and Nd Nb, then Nc/Nd>Na/Nb and Nc−Nd>Na−Nb are satisfied. Even if Nd>Nb, Nc>Na is preferably satisfied.

Rc<Ra is preferably satisfied, for example, when light enters the multilayer film 20 from the base 10 and when light of a predetermined wavelength is reflected by the multilayer film 20. This is because it is advantageous to place a reflective surface (interface) with a higher refractive index closer to the light incident surface (a lower surface 201) in order to increase the reflectance of the multilayer film 20. Rc<Ra is also preferably satisfied when light enters the multilayer film 20 from the opposite side of the multilayer film 20 from the base 10 and when light of a predetermined wavelength is transmitted by the multilayer film 20. This is because it is advantageous to place a reflective surface (interface) with a higher refractive index farther from the light incident surface (the upper surface 202) in order to increase the reflectance of the multilayer film 20.

The ratio Nc/Nd of the refractive index Nc of the dielectric layer 23 to the refractive index Nd of the dielectric layer 24 may be smaller than the ratio Na/Nb of the refractive index Na of the dielectric layer 21 to the refractive index Nb of the dielectric layer 22 (Nc/Nd<Na/Nb). Satisfying Nc/Nd<Na/Nb is advantageous for satisfying Rc<Ra.

The difference Nc−Nd between the refractive index Nc of the dielectric layer 23 and the refractive index Nd of the dielectric layer 24 may be smaller than the difference Na−Nb between the refractive index Na of the dielectric layer 21 and the refractive index Nb of the dielectric layer 22 (Nc−Nd<Na−Nb). The reflectance Rc increases with the difference Nc−Nd.

The sum Nc+Nd of the refractive index Nc of the dielectric layer 23 and the refractive index Nd of the dielectric layer 24 may be larger than the sum Na+Nb of the refractive index Na of the dielectric layer 21 and the refractive index Nb of the dielectric layer 22 (Nc+Nd>Na+Nb). The reflectance Rc increases as the sum Nc+Nd decreases.

The refractive index Nc of the dielectric layer 23 may be lower than the refractive index Na of the dielectric layer 21 (Nc<Na). If Nc<Na and Nd Nb, then Nc/Nd<Na/Nb and Nc−Nd<Na−Nb are satisfied. Even if Nd<Nb, Nc<Na is preferably satisfied.

Although light absorption by the dielectric layers 21, 22, 23, and 24 is preferably small, a light-absorbing material may be selected, for example, to satisfy the refractive index relationship with another dielectric layer. The dielectric layer 21 has an extinction coefficient Ka, the dielectric layer 22 has an extinction coefficient Kb, the dielectric layer 23 has an extinction coefficient Kc, and the dielectric layer 24 has an extinction coefficient Kd. The extinction coefficient is applied to light of a predetermined wavelength treated with the multilayer film 20.

For example, when light enters the multilayer film 20 from the opposite side of the multilayer film 20 from the base 10, Ka≥Kc is preferably satisfied rather than Ka<Kc. Furthermore, Kb≥Kd is preferably satisfied rather than Kb<Kd. This is because it is advantageous to place a dielectric layer with less light absorption closer to the light incident surface (the upper surface 202) in order to reduce light absorption by the multilayer film 20.

For example, when light enters the multilayer film 20 from the base 10, Ka≤Kc is preferably satisfied rather than Ka>Kc. Furthermore, Kb≤Kd is preferably satisfied rather than Kb>Kd. This is because it is advantageous to place a dielectric layer with less light absorption closer to the light incident surface (the lower surface 201) in order to reduce light absorption by the multilayer film 20.

Each dielectric layer of the multilayer film 20 may have a specific surface profile depending on its crystallinity (crystal grain size), film-forming conditions, and the like. The dielectric layers of the multilayer film 20 are sequentially stacked on the base 10. Thus, the surface profile of each dielectric layer can reflect not only the specific surface profile but also the underground profile thereof. In the multilayer film 20, an interface between two adjacent dielectric layers is preferably as flat as possible to improve optical characteristics. This is because it can reduce light scattering loss at the interface. For this purpose, the underground profile of each dielectric layer is preferably flat. For dielectric layers with different surface profiles, it is more effective to improve the surface flatness of a lower dielectric layer closer to the base 10 than to improve the surface flatness of an upper dielectric layer farther from the base 10. When a lower dielectric layer has a specific surface profile with large irregularities, an upper dielectric layer formed on the lower dielectric layer may have a specific surface profile with large irregularities reflecting the irregularities of the lower dielectric layer in addition to the specific surface profile of the upper dielectric layer. When a lower dielectric layer has a surface profile with small irregularities, however, an upper dielectric layer formed on the lower dielectric layer can have a surface profile similar to the specific surface profile of the upper dielectric layer. Thus, a face (surface) of the dielectric layer 21 opposite the base 10 is preferably flatter than a face (surface) of the dielectric layer 23 opposite the base 10. Likewise, a face (surface) of the dielectric layer 22 opposite the base 10 is preferably flatter than a face (surface) of the dielectric layer 24 opposite the base 10. For example, the surface (the upper surface 202) of the multilayer film 20 opposite the base 10 may have a surface roughness in the range of 1.0 to 3.0 nm RMS. Materials for the dielectric layers 21 and 22 can be selected such that the dielectric layers 21 and 22 have a flatter specific surface profile than the dielectric layers 23 and 24.

Each dielectric layer of the multilayer film 20 and the base 10 may have different densities. The dielectric layer 21 has a density ρa, the dielectric layer 22 has a density ρb, the dielectric layer 23 has a density ρc, and the dielectric layer 24 has a density ρd. In general, a material with higher density tends to have higher stress. Furthermore, a dielectric layer with a larger physical thickness tends to have higher stress. Stress in a dielectric layer can cause the dielectric layer to peel or crack. Thus, a dielectric layer with a larger physical thickness may have a lower density than a dielectric layer with a smaller physical thickness. This can decrease the difference in the absolute value of stress. This may be preferable when two adjacent dielectric layers have opposite stress (positive: tensile stress or negative: compressive stress) but may also be effective when two adjacent dielectric layers have the same positive or negative stress. When a low-refractive-index layer has a larger physical thickness than a high-refractive-index layer, the low-refractive-index layer may have a lower density than the high-refractive-index layer. For example, the density ρb of the dielectric layer 22 is preferably lower than the density ρa of the dielectric layer 21 (ρb<ρa). The density ρd of the dielectric layer 24 is preferably lower than the density ρc of the dielectric layer 23 (ρd<ρc). The term "the density of the dielectric layer", as used herein, refers to at least one of the intrinsic density of the substance and the film density depending on the formation conditions (filling ratio) of the dielectric layer. Theoretical densities may be compared, or film densities may be compared. At similar theoretical densities, the density increases with the filling ratio. At similar filling ratios, the density increases with the theoretical density.

An upper dielectric layer preferably has a lower density than a lower dielectric layer to prevent cracking or peeling in the multilayer film 20. Typically, the base 10 is thicker than the multilayer film 20 and tends to have higher stress. Thus, a lower dielectric layer preferably has higher absolute stress. For example, the density ρc of the dielectric layer 23 may be lower than the density ρa of the dielectric layer 21 (ρc<ρa). The density ρd of the dielectric layer 24 may be lower than the density ρb of the dielectric layer 22 (ρd<ρb). When the base 10 does not have so high stress, an upper dielectric layer may have higher density than a lower dielectric layer, and the density may be ρc>ρa and/or ρd>ρb.

Each dielectric layer of the multilayer film 20 and the base 10 may have different melting points. The dielectric layer 21 has a melting point Ma, the dielectric layer 22 has a melting point Mb, the dielectric layer 23 has a melting point Mc, and the dielectric layer 24 has a melting point Md. When a dielectric layer is formed by a vapor deposition method, the formation of an upper dielectric layer may increase the temperature of a dielectric material of a lower layer. Thus, it is preferable to devise a vapor deposition apparatus so that the temperature does not exceed the melting point of the lower dielectric layer.

Of two adjacent dielectric layers (a high-refractive-index layer and a low-refractive-index layer), a dielectric layer with a larger physical thickness tends to have a longer film-forming time. When a low-refractive-index layer has a larger physical thickness than a high-refractive-index layer, therefore, the low-refractive-index layer may have a lower melting point than the high-refractive-index layer. For example, the melting point Mb of the dielectric layer 22 is preferably lower than the melting point Ma of the dielectric layer 21 (Mb<Ma). The melting point Md of the dielectric layer 24 is preferably lower than the melting point Mc of the dielectric layer 23 (Md<Mc).

An upper dielectric layer also preferably has a lower melting point than a lower dielectric layer. For example, the melting point Mc of the dielectric layer 23 may be lower than the melting point Ma of the dielectric layer 21 (Mc<Ma). The melting point Md of the dielectric layer 24 may be lower than the melting point Mb of the dielectric layer 22 (Md<Mb). When the temperature rise of a dielectric material of a lower layer during the formation of an upper dielectric layer has small influence on film formation, for example, when a lower layer or a lower dielectric layer has a melting point of 1000° C. or more, the melting point may be Mc>Ma and/or Md>Mb.

The dielectric layer 22 may contain a compound of a metal element Mtlb. The metal element Mtlb of the compound in the dielectric layer 22 may be a typical element. The dielectric layer 24 may contain a compound of a metal element Mtld. The metal element Mtld of the compound in the dielectric layer 22 may be a typical element. The metal element Mtlb of the compound in the dielectric layer 22 and the metal element Mtld of the compound in the dielectric layer 24 may be the same element (Mtlb=Mtld). The metal element Mtlb may be different from the metal element Mtld.

The metal element Mtlb may be a typical element. The metal element Mtld may also be a typical element. Comparing compounds of the same non-metal element, a compound of a typical metal element typically has a lower refractive index than a compound of a transition metal element and is therefore suitable as a material for a low-refractive-index layer. However, at least one of the metal element Mtlb and the metal element Mtld may be a transition element.

A compound in the dielectric layer 22 is, for example, a compound of the metal element Mtlb and a non-metal element Ntlb, for example, a boride, a carbide, a nitride, an oxide, a fluoride, a sulfide, a phosphide, or a chloride, typically an oxide or a fluoride. A compound in the dielectric layer 24 is, for example, a compound of the metal element Mtld and a non-metal element Ntld, for example, a boride, a carbide, a nitride, an oxide, a fluoride, a sulfide, a phosphide, or a chloride, typically an oxide or a fluoride. The non-metal element Ntld may be the same as the non-metal element Ntlb, and the non-metal element Ntld may be different from the non-metal element Ntlb.

The dielectric layer 22 may contain a fluoride. A compound in the dielectric layer 22 may be a fluoride of the metal element Mtlc. The dielectric layer 24 may contain a fluoride. A compound in the dielectric layer 24 may be a fluoride of the metal element Mtld.

Many metal fluorides absorb less ultraviolet radiation than many metal oxides. In the optical component 30 that utilizes ultraviolet light by transmission or reflection, therefore, a metal fluoride contained in at least one of the dielectric layers 22 and 24 is effective in increasing the use efficiency of ultraviolet light.

Each of the dielectric layer 22 and the dielectric layer 24 may contain at least one of magnesium fluoride ($MgF_2$), aluminum fluoride ($AlF_3$), sodium fluoride (NaF), lithium fluoride (LiF), calcium fluoride ($CaF_2$), barium fluoride ($BaF_2$), strontium fluoride ($SrF_3$), silicon oxide ($SiO_2$), cryolite ($Na_3AlF_6$), and chiolite ($Na_5Al_3F_{14}$).

A compound in any one of the dielectric layers 21, 22, 23, 24, 25, and 26 may be a silicon compound instead of a compound of a metal element. Any one of the dielectric layers 21, 22, 23, and 24 may be silicon carbide, silicon nitride, or silicon oxide. Any one of the silicon carbide, silicon nitride, and silicon oxide may be silicon oxycarbide, silicon nitride carbide, or silicon oxide nitride.

The base 10 has a front surface 101 facing the multilayer film 20 and a back surface 102 opposite the multilayer film 20. The front surface 101 may be in contact with the multilayer film 20. The shape of the back surface 102 may be the same as or different from the shape of the front surface 101. The front surface 101 may be flatter than the back surface 102.

The multilayer film 20 has the lower surface 201 facing the base 10 and the upper surface 202 opposite the base 10. The lower surface 201 of the multilayer film 20 may have the same shape as the front surface 101 of the base 10. The lower surface 201 of the multilayer film 20 facing the base 10 may be flatter than the upper surface 202 of the multilayer film 20 opposite the base 10. The upper surface 202 of the multilayer film 20 opposite the base 10 may have a surface roughness in the range of 1.0 to 3.0 nm RMS.

The dielectric layer 21 has a lower surface 211 facing the base 10 and an upper surface 212 opposite the base 10. The dielectric layer 23 has a lower surface 231 facing the base 10 and an upper surface 232 opposite the base 10. The upper surface 212 of the dielectric layer 21 opposite the base 10 may be flatter than the top surface 232 of the dielectric layer 23 opposite the base 10. The lower surface 211 of the dielectric layer 21 facing the base 10 may be flatter than the lower surface 231 of the dielectric layer 23 facing the base 10.

The base 10 may be a conductor, a semiconductor, or an insulator. The base 10 may be a single crystal body, a polycrystalline body, or an amorphous body. The base 10 may be a single crystal body or a polycrystalline body. The base 10 may be, for example, a metallic polycrystalline body, a semiconductor single crystal body, a semiconductor polycrystalline body, or an insulator single crystal body. The base 10 may contain at least one of calcium fluoride ($CaF_2$), magnesium fluoride ($MgF_2$), barium fluoride ($BaF_2$), silicon oxide ($SiO_2$), CLEARCERAM (registered trademark), Zerodur (registered trademark), and BK7. The base 10 may be fluorite. The base 10 may be glass or plastic.

The multilayer film 20 may include the dielectric layer 25. The dielectric layer 21, the dielectric layer 22, the dielectric layer 23, and the dielectric layer 24 are located between the dielectric layer 25 and the base 10. The refractive index Ne of the dielectric layer 25 may be lower than the refractive index Nc of the dielectric layer 23 (Ne<Nc). The refractive index Ne of the dielectric layer 25 may be higher than the refractive index Nd of the dielectric layer 24 (Ne>Nd). The dielectric layer 25 and the dielectric layer 24 may have different compositions.

The dielectric layer 25 may contain a compound of a metal element Mtle. The metal element Mtle of the compound in the dielectric layer 25 may be a typical element. The metal element Mtle of the compound in the dielectric layer 25 and the metal element Mtld of the compound in the dielectric layer 24 may be the same element (Mtle=Mtld). The metal element Mtle may be different from the metal element Mtld.

A compound in the dielectric layer 25 is, for example, a compound of the metal element Mtle and a non-metal element Ntle, for example, a boride, a carbide, a nitride, an oxide, a fluoride, a sulfide, a phosphide, or a chloride, typically an oxide or a fluoride. The non-metal element Ntle may be the same as the non-metal element Ntld, or the non-metal element Ntle may be different from the non-metal element Ntld.

The dielectric layer 25 may contain at least one of magnesium fluoride, aluminum fluoride, sodium fluoride, lithium fluoride, calcium fluoride, barium fluoride, strontium fluoride, silicon oxide, cryolite, and chiolite.

The multilayer film 20 may include the dielectric layer 26. The dielectric layer 21, the dielectric layer 22, the dielectric layer 23, and the dielectric layer 24 are located between the dielectric layer 26 and the base 10. The refractive index Nf of the dielectric layer 26 may be higher than the refractive index Ne of the dielectric layer 25 (Nf>Ne). The dielectric layer 26 and the dielectric layer 23 may have the same composition.

The dielectric layer 26 may contain a compound of a metal element Mtlf. The metal element Mtlf of the compound in the dielectric layer 26 may be a transition element. The metal element Mtlf of the compound in the dielectric layer 26 and the metal element Mtlc of the compound in the dielectric layer 23 may be the same element (Mtlf=Mtlc). The metal element Mtlf may be different from the metal element Mtlc.

A compound in the dielectric layer 26 is, for example, a compound of the metal element Mtlf and a non-metal element Ntlf, for example, a boride, a carbide, a nitride, an oxide, a fluoride, a sulfide, a phosphide, or a chloride, typically an oxide or a fluoride.

The dielectric layer 23 may contain at least one of neodymium fluoride, lanthanum fluoride, gadolinium fluoride, samarium fluoride, cerium fluoride, ytterbium fluoride, and aluminum oxide.

Figure 3A:
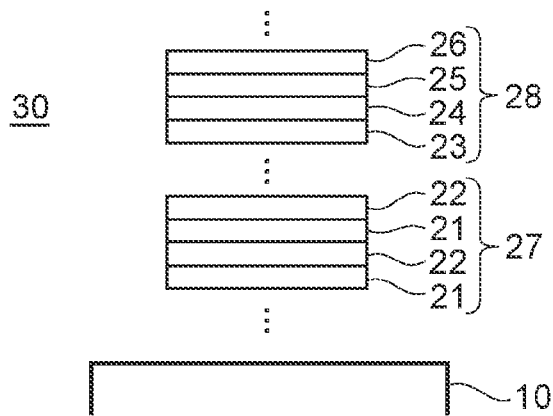
FIGS. 3A and 3B are schematic views of an optical component.
Figure 3B:
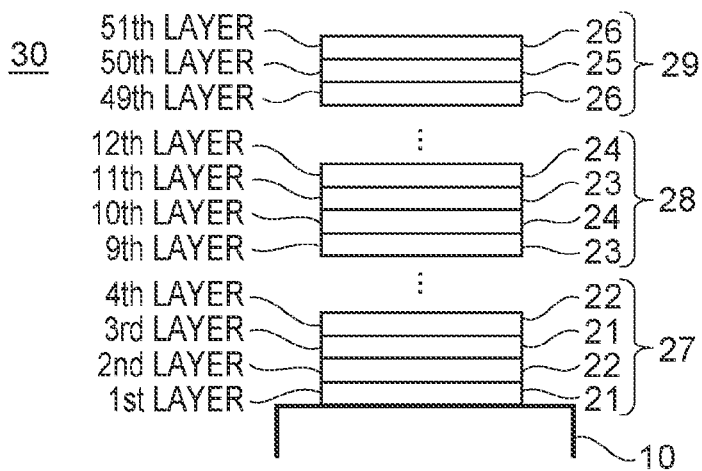

FIG. 3A illustrates a more suitable embodiment of the optical component 30. The multilayer film 20 includes a dielectric layer group 27 and a dielectric layer group 28. The dielectric layer group 27 is located between the dielectric layer group 28 and the base 10. The multilayer film 20 may include the dielectric layer group 29. The dielectric layer group 28 is located between the dielectric layer group 27 and the dielectric layer group 29.

The dielectric layer group 27 includes i (i≥2) dielectric layers 21 (dielectric layers 21-1 to 21-*i*). Each of the i dielectric layers 21 of the dielectric layer group 27 contains at least two elements contained in one dielectric layer 21 (for example, the dielectric layer 21-2) of the i dielectric layers 21.

The dielectric layer group 27 includes i dielectric layers 22 (dielectric layers 22-1 to 22-*i*). The i dielectric layers 22 of the dielectric layer group 27 contain at least two elements contained in one dielectric layer 22 (for example, the dielectric layer 22-2) of the i dielectric layers 22. In the dielectric layer group 27, when the i dielectric layers 21 and the i dielectric layers 22 are alternately stacked, i is at least 2.

The dielectric layer group 28 includes j (j≥2) dielectric layers 23 (dielectric layers 23-1 to 23-*j*). Each of the j dielectric layers 23 of the dielectric layer group 28 contains at least two elements contained in one dielectric layer 23 (for example, the dielectric layer 23-2) of the j dielectric layers 23. The dielectric layer group 28 includes j dielectric layers 24 (dielectric layers 24-1 to 24-*j*). The j dielectric layers 24 of the dielectric layer group 28 contain at least two elements contained in one dielectric layer 24 (for example, the dielectric layer 24-2) of the j dielectric layers 24. In the dielectric layer group 28, when the j dielectric layers 23 and the j dielectric layers 24 are alternately stacked, j is at least 2.

Preferably, i and j are not extremely different from each other. More specifically, $0.2 \leq i/j \leq 5$ is preferably satisfied. $i \leq j$ is preferably satisfied, and $i < j$ is more preferably satisfied. This is because the dielectric layer group 27 is closer to the base 10 than the dielectric layer group 28 and is therefore less affected by the shape of the underground. For narrowband wavelength dependence, at least one of i≥3 and j≥3 is satisfied, and at least one of i≥10 and j≥10 is more preferably satisfied. To simplify a film forming step and decrease the thickness of the multilayer film 20, i≤30 and j≤30 are preferably satisfied.

The dielectric layer group 28 includes one dielectric layer 25 and two dielectric layers 26 (dielectric layers 26-1 and 26-2). The dielectric layer 25 is located between the dielectric layer 26-1 and the dielectric layer 26-2.

The optical component 30 can be applied to various optical apparatuses EQP. Examples of the optical apparatuses EQP including the optical component 30 include camera lenses, telescopes, projectors, exposure apparatuses, and measuring devices. In particular, the optical component 30 is suitable for optical apparatuses including a light source, such as projectors, exposure apparatuses, and measuring devices. This is because the multilayer film 20 of the optical component 30 can be designed to match the wavelength of the light source such that the optical component 30 transmits and/or reflects light from the light source. The light from the light source may be infrared light, visible light, or ultraviolet light. Many metal fluorides absorb less ultraviolet light than other metal compounds and are therefore suitable when the light source is ultraviolet light.

Figure 4:
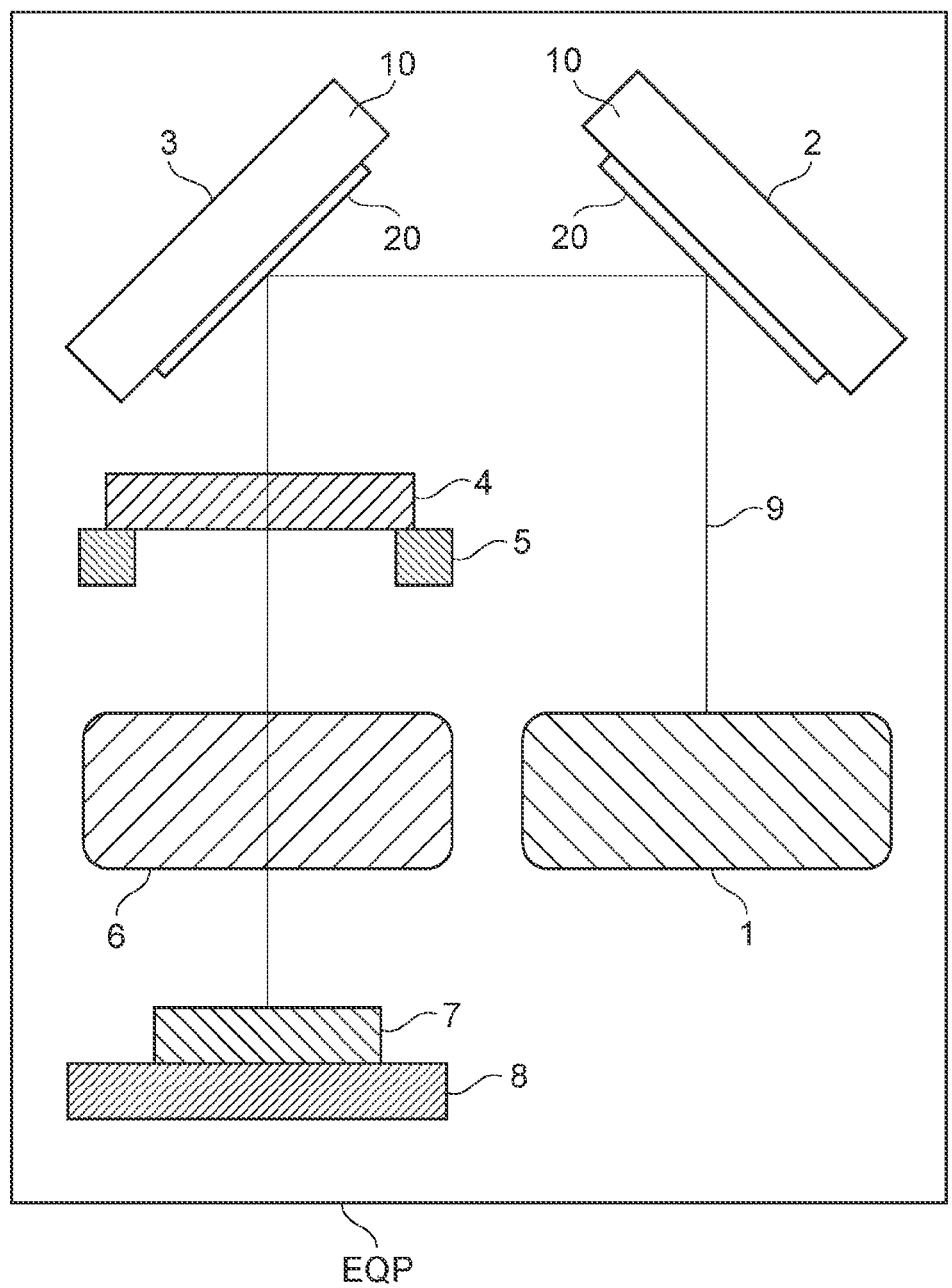
FIG. 4 is a schematic view of an optical apparatus.

FIG. 4 is a schematic view of an exposure apparatus as an example of the optical apparatuses EQP. The optical apparatus EQP, which is an exposure apparatus, includes a light source 1 and mirrors 2 and 3 constituting an illumination optical system. The optical apparatus EQP also includes a reticle stage 5 for supporting a reticle 4, a projection optical system 6 for projecting a pattern of the reticle 4, and a substrate stage 8 for supporting a substrate 7. Exposure light 9 from the light source 1 is reflected by the mirrors 2 and 3 of the illumination optical system and is directed to the reticle 4. The exposure light 9 with the pattern of the reticle 4 is focused by the projection optical system 6 and is projected onto the substrate 7. The pattern formed on the reticle 4 by the light source 1 and the optical component 30 is projected onto the substrate 7. A photoresist is applied to the substrate 7 and is exposed to the exposure light 9. The substrate 7 may be a semiconductor wafer or a glass substrate for a flat-panel display (FPD). The exposure light of the exposure apparatus is typically ultraviolet light. The wavelength of the exposure light is 436 nm in a g-line light source or approximately 365 nm in an i-line light source. The wavelength of the exposure light is approximately 248 nm in a KrF excimer laser light source, approximately 193 nm in an ArF excimer laser light source, or 10 to 20 nm in an extreme ultraviolet (EUV) light source. Although the optical component 30 is used for the mirrors 2 and 3 of the illumination optical system in the present embodiment, the optical component 30 may be used for a lens of a projection optical system. Furthermore, a projection optical system may be constituted by a mirror, and the optical component 30 may be used for the mirror. The projection optical system may be of a reduction projection type, a one to one projection type, or an enlarged projection type. Although the reticle 4 is of a transmission type in the present embodiment, the reticle 4 may be of a reflection type. The projection optical system may be of a refraction type using a lens or a reflection type using a mirror. The optical component 30 may be used for a mirror of a reflective reduction projection optical system in an exposure apparatus equipped with an EUV light source.

EXEMPLARY EMBODIMENTS

A semiconductor exposure apparatus controls an optical path by reflecting an excimer laser beam emitted from a light source with a mirror and by refracting the excimer laser beam with a lens, and reduces and projects a fine pattern formed on a reticle onto a silicon wafer. The light source is a KrF excimer laser with a wavelength of approximately 248 nm, an ArF excimer laser with a wavelength of approximately 193 nm, or the like.

The mirror is formed of a multilayer film including a high-refractive-index layer and a low-refractive-index layer alternately stacked on a base material and increases reflectance by utilizing interference of light. The reflectance of the mirror can increase with the difference in refractive index between the high-refractive-index material and the low-refractive-index material. Due to its low ultraviolet absorption and high laser resistance, a metal fluoride is suitable for a high-refractive-index layer and a low-refractive-index layer of a mirror for an ultraviolet laser. For example, a metal fluoride with a high refractive index may be lanthanum fluoride ($LaF_3$), gadolinium fluoride ($GdF_3$), or neodymium fluoride ($NdF_3$). A metal fluoride in a low-refractive-index layer may be aluminum fluoride ($AlF_3$) or magnesium fluoride ($MgF_2$).

For example, 20 pairs of alternating layers of $LaF_3$ and $AlF_3$ are stacked on the substrate, and $LaF_3$, $MgF_2$, and $LaF_3$ are stacked thereon. This structure can theoretically have a reflectance of 99% or more at 193 nm. However, $LaF_3$ used as a high-refractive-index layer has crystallinity, and in particular the multilayer film has a considerably large interface or surface roughness when the multilayer film is formed by a vacuum deposit method. An interface or surface with a large roughness scatters a laser light and rarely has theoretical reflectance characteristics. Consequently, an actually manufactured mirror has a reflectance several percent lower than the theoretical reflectance. The same is true when another material, such as $GdF_3$ or $NdF_3$, is used for a high-refractive-index film.

In the present exemplary embodiment, therefore, an optical component that can be used as a mirror for an ArF excimer laser with a lasing wavelength of 193 nm or an ultraviolet laser with a light incident angle of 45 degrees is described below. It should be noted that the present disclosure is not limited to the present exemplary embodiment.

A 35 mm×47 mm×5 mmt fluorite ($CaF_2$) substrate polished to a surface roughness of 0.8 nm RMS or less was used as a base material. In the present exemplary embodiment, the surface roughness is measured at 512 points×512 points in a mesh shape in the range of 1 μm×1 μm using an atomic force microscope (AFM).

M ($0 \leq M \leq 24$) pairs of an ytterbium fluoride layer (hereinafter referred to as $YbF_3$) and an aluminum fluoride layer (hereinafter referred to as $AlF_3$) are stacked on a fluorite substrate. Furthermore, L (L=24−M) pairs of a lanthanum fluoride layer (hereinafter referred to as $LaF_3$) and $AlF_3$ are stacked thereon. Furthermore, $LaF_3$, a magnesium fluoride layer (hereinafter referred to as $MgF_2$), and $LaF_3$ are stacked thereon in this order. In this manner, a multilayer film composed of 51 dielectric layers in total is formed. The M (M=n/2) pairs of $YbF_3/AlF_3$ constitute first to n-th layers, and the L (L=24−M=24−n/2) pairs of $LaF_3/AlF_3$ constitute (n+1)th to 48th layers.

In the present exemplary embodiment, a vacuum evaporator was used to form a metal fluoride film. The present disclosure is not limited to the vacuum deposit method and is also applicable to known physical vapor deposition methods (a molecular beam vapor deposition method, an ion plating method, an ion beam vapor deposition method, a sputtering method, etc.).

An outline of the vacuum evaporator used in the present exemplary embodiment is described below. Four vessels (molybdenum boats) in a vacuum chamber were filled with $YbF_3$ as a vapor deposition material α, $AlF_3$ as a vapor deposition material β, $LaF_3$ as a vapor deposition material γ, and $MgF_2$ as a vapor deposition material δ. The four vapor deposition materials are placed on a concentric circle with a radius of 250 mm from the substrate resistance axis located at the center of the chamber and are equipped with a resistive heating mechanism. The substrate is fixed to a substrate holder and rotates and revolves at a height of 1100 mm from the vapor deposition materials. The phrase "rotates and revolves", as used herein, means that the substrate rotates around the substrate rotation axis and simultaneously revolves around the substrate revolution axis. The substrate rotates 2.54 times per revolution. A shield mask is provided 100 mm below the substrate and is processed in advance into a designed shape to form a film with a uniform thickness on the substrate. During film formation, the substrate can be heated by a substrate heating mechanism. The film formation rate is monitored with a film thickness monitor placed at the center of the plane of revolution of the substrate, and a mechanism is provided to control the current value of resistive heating such that the film formation rate is constant.

During film formation, the pressure in the vacuum chamber was $5.0 \times 10^{-5}$ Pa, and the substrate temperature was 280° C. The vapor deposition materials were successively formed into a film with a predetermined thickness in accordance with the film design shown in Table 1. The film formation rate was controlled to 0.6 nm/s for $YbF_3$, 0.2 nm/s for $AlF_3$, 0.2 nm/s for $LaF_3$, or 0.2 nm/s for $MgF_2$. Each of the $YbF_3$, $LaF_3$, $AlF_3$, and $MgF_2$ dielectric layers has tensile stress.

The density (theoretical density) is 5.9 g/cm³ in $LaF_3$, 2.9 g/cm³ in $AlF_3$, 3.2 g/cm³ in $MgF_2$, or 8.2 g/cm³ in $YbF_3$. The melting point is 1490° C. in $LaF_3$, 1040° C. in $AlF_3$, 1248° C. in $MgF_2$, or 1159° C. in $YbF_3$.

The refractive index of the film formed under the above film-forming conditions is 1.69 for $LaF_3$, 1.41 for $AlF_3$, 1.44 for $MgF_2$, or 1.68 for $YbF_3$. These refractive indices are for light with a wavelength of 193 nm.

The refractive index of each material was calculated as described below. A monolayer film of each material with a thickness in the range of 50 to 100 nm was formed on a $\phi$15 mm×2 mmt fluorite substrate, and reflectance was measured with a spectrometer in the wavelength range of 180 to 240 nm at a light incidence angle of 15 degrees. The reflectance was analyzed using optical thin film analysis and design software FilmWizard™, and the refractive index of the monolayer film was calculated.

The $YbF_3$ film formed by the vacuum deposit method has a refractive index of approximately 1.63 when formed at a standard film formation rate. The present inventors have found through extensive studies that the refractive index can be increased to 1.65 or more, for example, 1.68 for a wavelength of 193 nm at a higher film formation rate. The present inventors have found that the $YbF_3$ film formed at 0.6 nm/s using a vapor deposition apparatus with a standard film formation rate of 0.2 nm/s can have a refractive index of 1.68. Although the reason for the greatly increased refractive index of the $YbF_3$ film formed by the vacuum deposit method at an increased film formation rate is not clear, such a high-speed film formation may prevent the incorporation of impurities. Thus, in an optical component including a base and an ytterbium fluoride layer located on the base, the ytterbium fluoride layer can have a refractive index of 1.65 or more for light with a wavelength of 193 nm. The ytterbium fluoride layer may have a refractive index of less than 1.69 for light with a wavelength of 193 nm.

Metal fluorides may have a surface roughness depending on the type of compound. For example, as a high-refractive-index material (refractive index: 1.50 or more), $LaF_3$ has a surface roughness of 5.8 nm RMS, $GdF_3$ has a surface roughness of 6.3 nm RMS, $SmF_3$ has a surface roughness of 8.9 nm RMS, and $YbF_3$ has a surface roughness of 1.1 nm RMS. As a low-refractive-index material (refractive index: 1.50 or less), $AlF_3$ has a surface roughness of 0.9 nm RMS, and $MgF_2$ has a surface roughness of 2.2 nm RMS. The surface roughness (Rms) of each monolayer film was measured by AFM with the same vapor deposition apparatus, in which the substrate was placed such that deposited particles were formed at an incident angle of 70 degrees with respect to the substrate, and a monolayer film 100 nm in thickness was formed.

In general, metal fluorides are crystalline, and their crystal grains increase the surface roughness. $AlF_3$ is exceptionally amorphous and has a small roughness. The high-refractive-index materials $LaF_3$, $GdF_3$, and $SmF_3$ have a large roughness (more than 3.0 nm RMS). Although $YbF_3$ is a high-refractive-index material, $YbF_3$ has a roughness as small as $AlF_3$, which is exceptionally amorphous among metal fluorides. High-refractive-index materials of metal fluorides not described herein are also crystalline films like $LaF_3$, $GdF_3$, and $SmF_3$ and therefore probably have a large surface roughness. Thus, $YbF_3$ has an inherent characteristic of being very smooth among metal fluoride high-refractive-index materials.

The use of $YbF_3$ with a refractive index of 1.68 as a high-refractive-index layer was investigated by changing the number of pairs M and the number of layers n. $YbF_3$ is a high-refractive-index layer with a small roughness but has a refractive index smaller than the refractive index (1.69) of $LaF_3$. Thus, $YbF_3$ and $LaF_3$ should be appropriately combined to form a multilayer film. More specifically, $YbF_3$ was used for a high-refractive-index layer of a multilayer film near the substrate to which a relatively small amount of light reaches, and $LaF_3$ was used for a high-refractive-index layer of the multilayer film near the atmosphere to which a large amount of light reaches. In this structure, $YbF_3$ with a small roughness near the substrate can reduce the roughness of the entire multilayer film mirror, and $LaF_3$ used for the layer near the atmosphere can increase the theoretical reflectance. Thus, a mirror with a high reflectance can be finally produced.

Table 1 shows films of types A to C that have different numbers of alternating layers of $YbF_3/AlF_3$ and different numbers of alternating layers of $LaF_3/AlF_3$.

TABLE 1

| | Type A | | Type B | | Type C | |
|---|---|---|---|---|---|---|
| | Compound | Physical thickness | Compound | Physical thickness | Compound | Physical thickness |
| 51th layer | LaF3 | 31 nm | LaF3 | 31 nm | LaF3 | 31 nm |
| 50th layer | MgF2 | 38 nm | MgF2 | 38 nm | MgF2 | 38 nm |
| 49th layer | LaF3 | 31 nm | LaF3 | 31 nm | LaF3 | 31 nm |
| n + 3rd to 48th layers | Repetition of n + 1st and n + 2nd layers | | Repetition of n + 1st and n + 2nd layers | | Repetition of n + 1st and n + 2nd layers | |
| n + 2nd layer | AlF3 | 39 nm | AlF3 | 39 nm | AlF3 | 39 nm |
| n + 1st layer | LaF3 | 31 nm | LaF3 | 31 nm | YbF3 | 32 nm |
| 3rd to n-th layer | Repetition of 1st and 2nd layers | | Repetition of 1st and 2nd layers | | Repetition of 1st and 2nd layers | |
| 2nd layer | AlF3 | 39 nm | AlF3 | 39 nm | AlF3 | 39 nm |
| 1st layer | YbF3 | 32 nm | LaF3 | 31 nm | YbF3 | 32 nm |
| Substrate | CaF2 | — | CaF2 | — | CaF2 | — |

Type A n/2 pairs of $YbF_3$ and $AlF_3$, 24–n/2 pairs of $LaF_3$ and $AlF_3$, and $LaF_3$, $MgF_2$, and $LaF_3$ are stacked on a fluorite substrate in this order. Table 1 shows the physical thickness of each layer at 193 nm. The physical thickness of each layer is such that the optical thickness is 26% to 29% of 193 nm.

Type B 24 pairs of $LaF_3$ and $AlF_3$, and $LaF_3$, $MgF_2$, and $LaF_3$ are stacked on the fluorite substrate in this order. Table 1 shows the physical thickness of each layer at 193 nm. Each layer in Type B was formed under the same conditions as the same film type in Type A.

Type C 24 pairs of $YbF_3$ and $AlF_3$, and $LaF_3$, $MgF_2$, and $LaF_3$ are stacked on the fluorite substrate in this order. Table 1 shows the physical thickness of each layer at 193 nm. Each layer in Type C was formed under the same conditions as the same film type in Type A.

Evaluation

Figure 3C:
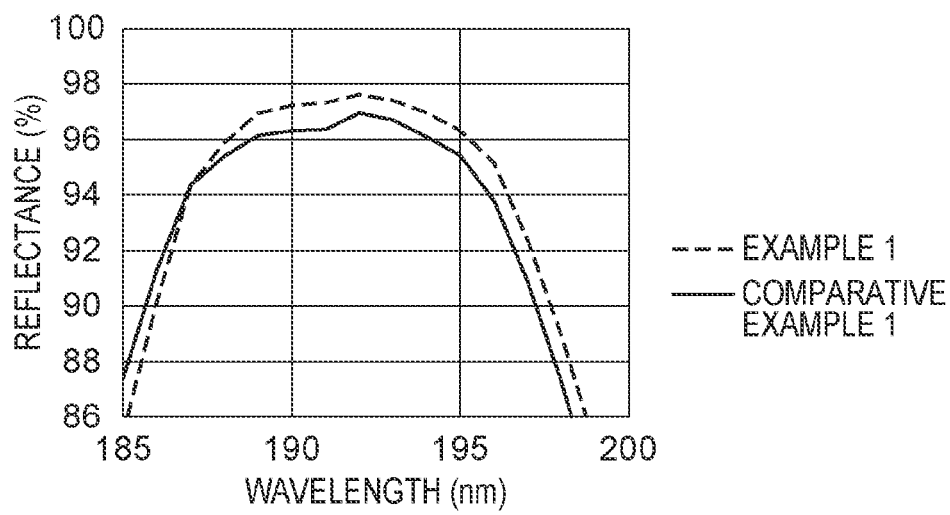
FIG. 3C is a graph of reflectance characteristics.

Table 2 shows the comparison results of the reflectance and surface roughness of the optical components of types A, B, and C. Table 2 shows the characteristics of Type A for different n values. FIG. 3C shows the reflectance characteristics of Types A and B. At a wavelength of 193 nm, the mirror of Type A can have a reflectance approximately 0.7% higher than Type B. The reflectance of each mirror was measured with a spectrometer at a light incident angle of 45 degrees.

TABLE 2

|  | n | Reflectance (%) | Surface roughness (nmRMS) |
| --- | --- | --- | --- |
| Type A | 8 | 97.6 | 2.4 |
| Type A | 16 | 97.7 | 1.9 |
| Type A | 24 | 97.6 | 1.3 |
| Type A | 32 | 97.2 | 1.3 |
| Type A | 40 | 97.0 | 1.2 |
| Type B | 4 | 96.9 | 3.1 |
| Type C | 44 | 96.5 | 1.1 |

Comparing Type A and Type B, Type B has a larger difference between the high-refractive-index layer and the low-refractive-index layer and theoretically has a higher reflectance. However, the roughness of the top surface measured by AFM was 3.1 nm RMS in Type B and 2.4 nm RMS in Type A. Thus, in Type A, the surface roughness of the surface of the multilayer film opposite the base ranges from 1.0 to 3.0 nm RMS. Type B has a larger roughness and a larger scattering loss. Thus, even though Type B has a higher theoretical reflectance, Type A with a smaller roughness has a higher actual reflectance. This is probably due to a smaller roughness of $YbF_3$ than other metal fluoride high-refractive-index films.

At a refractive index of 1.63, even if the roughness is small, simply replacing the high-refractive-index layer from $LaF_3$ to $YbF_3$ cannot result in a higher reflectance than Type B. However, when the refractive index can be increased to 1.68, depending on the combination of materials of the dielectric layer, the reflectance can be higher than Type B. In the combination of the dielectric layers shown in Type A, the reflectance could be equal to or higher than Type B. By contrast, Type C, in which all pairs of 48 layers were $YbF_3/AlF_3$ alternating layers, had a small roughness but a low reflectance.

The present exemplary embodiment can reduce the roughness of the interface and surface in the multilayer film and consequently provide a mirror for an ultraviolet laser with high reflectance.

The present disclosure can provide an advantageous technique for improving optical characteristics of optical components.

These embodiments may be appropriately modified without departing from the technical idea. It should be noted that the disclosure of the present specification includes not only what is described herein but also all matters that can be understood from the present specification and the drawings attached hereto.

The disclosure of the present specification also includes a complement of the individual concepts described herein. More specifically, for example, a description "A is larger than B" in the present specification also discloses "A is not larger than B", even if the description "A is not larger than B" is omitted. This is because the description "A is larger than B" takes "A is not larger than B" into account as a precondition.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-180167 filed Oct. 28, 2020, which is hereby incorporated by reference herein in its entirety.

What is claimed is:

1. An optical component comprising:
   a base; and
   a multilayer film including a first layer group located on the base and a second layer group located between the first layer group and the base,
   wherein the second layer group includes a plurality of first dielectric layers and a plurality of second dielectric layers alternately stacked such that at least one second dielectric layer of the plurality of second dielectric layers is located between two first dielectric layers of the plurality of first dielectric layers, and at least one first dielectric layer of the plurality of first dielectric layers is located between two second dielectric layers of the plurality of second dielectric layers,
   the first layer group includes a plurality of third dielectric layers and a plurality of fourth dielectric layers alternately stacked such that at least one fourth dielectric layer of the plurality of fourth dielectric layers is located between two third dielectric layers of the plurality of third dielectric layers, and at least one third dielectric layer of the plurality of third dielectric layers is located between two fourth dielectric layers of the plurality of fourth dielectric layers,
   each first dielectric layer of the plurality of first dielectric layers has a higher refractive index than each second dielectric layer of the plurality of second dielectric layers,
   each third dielectric layer of the plurality of third dielectric layers has a higher refractive index than each fourth dielectric layer of the plurality of fourth dielectric layers, and
   each third dielectric layer of the plurality of third dielectric layers has a lower density than each first dielectric layer of the plurality of first dielectric layers,
   wherein the first layer group and the second layer group are used to reflect light which has entered the multilayer film from the opposite side of the base, and
   wherein a material for each first dielectric layer is selected to contain ytterbium fluoride such that each first dialectic layer has a flatter specific surface profile than each third dielectric layer.

2. The optical component according to claim 1, wherein each first dielectric layer of the plurality of first dielectric layers has a different composition from each second dielectric layer of the plurality of second dielectric layers, and each third dielectric layer of the plurality of third dielectric layers contains a metal element different from ytterbium.

3. The optical component according to claim 2, wherein the metal element is a rare-earth element.

4. The optical component according to claim 1, wherein each third dielectric layer of the plurality of third dielectric layers contains a fluoride.

5. The optical component according to claim 1, wherein each third dielectric layer of the plurality of third dielectric layers contains at least one of neodymium fluoride, lanthanum fluoride, gadolinium fluoride, samarium fluoride, cerium fluoride, and aluminum oxide.

6. The optical component according to claim 1, wherein
each second dielectric layer of the plurality of second dielectric layers contains a compound of a metal element, and
each fourth dielectric layer of the plurality of fourth dielectric layers contains a compound of a metal element.

7. The optical component according to claim 6, wherein
the metal element of the compound in each second dielectric layer of the plurality of second dielectric layers is a typical element, and
the metal element of the compound in each fourth dielectric layer of the plurality of fourth dielectric layers is a typical element.

8. The optical component according to claim 1, wherein
each second dielectric layer of the plurality of second dielectric layers contains a fluoride, and
each fourth dielectric layer of the plurality of fourth dielectric layers contains a fluoride.

9. The optical component according to claim 1, wherein each second dielectric layer of the plurality of second dielectric layers and each fourth dielectric layer of the plurality of fourth dielectric layers contains at least one of magnesium fluoride, aluminum fluoride, sodium fluoride, lithium fluoride, calcium fluoride, barium fluoride, strontium fluoride, silicon oxide, cryolite, and chiolite.

10. The optical component according to claim 1, wherein a surface of each first dielectric layer of the plurality of first dielectric layers opposite the base is flatter than a surface of each third dielectric layer of the plurality of third dielectric layers opposite the base.

11. The optical component according to claim 1, wherein
the multilayer film includes i (i≥2) dielectric layers each containing at least two elements contained in the plurality of first dielectric layers,
the multilayer film includes j (j≥2) dielectric layers each containing at least two elements contained in the plurality of third dielectric layers, and
0.2≤i/j≤5 is satisfied.

12. The optical component according to claim 1, wherein a surface of the multilayer film opposite the base has a surface roughness in the range of 1.0 to 3.0 nm RMS.

13. The optical component according to claim 1, wherein
the multilayer film includes a fifth dielectric layer,
each first dielectric layer of the plurality of first dielectric layers, each second dielectric layer of the plurality of second dielectric layers, each third dielectric layer of the plurality of third dielectric layers, and each fourth dielectric layer of the plurality of fourth dielectric layers are located between the fifth dielectric layer and the base, and
at least one of (a) and (b) is satisfied:
(a) the fifth dielectric layer has a lower refractive index than each third dielectric layer of the plurality of third dielectric layers and a higher refractive index than each fourth dielectric layer of the plurality fourth first dielectric layers, and
(b) the fifth dielectric layer contains magnesium fluoride.

14. The optical component according to claim 1, wherein the base is a single crystal or a polycrystal.

15. The optical component according to claim 1, wherein the base contains calcium fluoride.

16. An optical apparatus comprising:
a light source; and
the optical component according to claim 1,
wherein the optical component transmits and/or reflects light from the light source.

17. The optical apparatus according to claim 16, wherein the light is ultraviolet light.

18. The optical apparatus according to claim 16, further comprising:
a first stage configured to support a reticle; and
a second stage configured to support a substrate,
wherein a pattern formed by the light source, the optical component, and the reticle is projected on the substrate.

19. The optical component according to claim 1, wherein the optical component is a mirror optical member.

* * * * *